United States Patent
Navarro

(10) Patent No.: US 9,806,560 B2
(45) Date of Patent: Oct. 31, 2017

(54) UPS WITH MULTIPLE INDEPENDENT STATIC SWITCHES

(71) Applicant: Eaton Corporation, Cleveland, OH (US)

(72) Inventor: George Arthur Navarro, Raleigh, NC (US)

(73) Assignee: Eaton Corporation, Cleveland, OH (US)

( * ) Notice: Subject to any disclaimer, the term of this patent is extended or adjusted under 35 U.S.C. 154(b) by 631 days.

(21) Appl. No.: 13/644,936

(22) Filed: Oct. 4, 2012

(65) Prior Publication Data

US 2014/0097680 A1    Apr. 10, 2014

(51) Int. Cl.
H02J 9/06    (2006.01)

(52) U.S. Cl.
CPC .............. *H02J 9/06* (2013.01); *Y02P 80/11* (2015.11); *Y10T 307/344* (2015.04)

(58) Field of Classification Search
CPC ...................................... H02J 9/00; H02J 9/06
See application file for complete search history.

(56) References Cited

U.S. PATENT DOCUMENTS

| | | | | |
|---|---|---|---|---|
| 5,210,685 A * | 5/1993 | Rosa | ..................... | H02J 9/062 307/64 |
| 5,771,161 A | 6/1998 | Jackson et al. | | |
| 6,144,115 A | 11/2000 | Massie et al. | | |
| 6,191,500 B1 * | 2/2001 | Toy | ..................... | H02J 3/46 307/64 |
| 6,295,215 B1 | 9/2001 | Faria et al. | | |
| 6,317,346 B1 * | 11/2001 | Early | ..................... | H02J 3/38 363/65 |
| 6,560,128 B1 * | 5/2003 | Rajda | ..................... | H02J 9/062 363/50 |
| 6,630,752 B2 | 10/2003 | Fleming et al. | | |
| 7,064,458 B2 | 6/2006 | Wittner | | |
| 7,129,599 B2 | 10/2006 | Divan et al. | | |
| 7,265,458 B2 | 9/2007 | Edelen et al. | | |

(Continued)

OTHER PUBLICATIONS

International Search Report and Written Opinion Corresponding to International Application No. PCT/US2013/063175; Date of Mailing: Nov. 11, 2014; 17 Pages.

(Continued)

*Primary Examiner* — Rexford Barnie
*Assistant Examiner* — Terrence Willoughby
(74) *Attorney, Agent, or Firm* — Ward and Smith, P.A.

(57) ABSTRACT

An uninterruptible power supply (UPS) includes a frame, at least one AC input supported by the frame and configured to be coupled to at least one external power source and at least one AC output supported by the frame and configured to be coupled to at least one external load. The UPS also includes a power conversion circuit supported by the frame and having an output coupled to the at least one AC output, the power conversion circuit configured to selectively provide power from first and second power sources. The UPS further includes first and second static switches supported by the frame and configured to couple and decouple the at least one AC input to and from the at least one AC output and a control circuit supported by the frame and configured to cooperatively control the power conversion circuit and the first and second static switches.

15 Claims, 8 Drawing Sheets

(56) References Cited

U.S. PATENT DOCUMENTS

| | | | |
|---|---|---|---|
| 7,566,988 B2 | 7/2009 | Heber et al. | |
| 8,159,086 B2 | 4/2012 | Karipides | |
| 2005/0288826 A1* | 12/2005 | Tassitino | H02J 9/062 |
| | | | 700/295 |
| 2006/0290205 A1* | 12/2006 | Heber | H02J 9/062 |
| | | | 307/65 |
| 2009/0256422 A1* | 10/2009 | Fox | H02J 9/062 |
| | | | 307/23 |
| 2009/0271642 A1* | 10/2009 | Cheng | G06F 1/263 |
| | | | 713/300 |
| 2011/0140523 A1* | 6/2011 | Ziegler | 307/44 |
| 2013/0080793 A1* | 3/2013 | Familiant | G06F 1/26 |
| | | | 713/300 |

OTHER PUBLICATIONS

Invitation to Pay Additional Fees Corresponding to International Application No. PCT/US2013/063175; Date of Mailing: Sep. 5, 2014; 5 Pages.

Chinese Office Action; CN Application No. 201380052021.1, mailed Jan. 4, 2007, 9 pages.

* cited by examiner

UPS WITH MULTIPLE INDEPENDENT STATIC SWITCHES

BACKGROUND

The inventive subject matter relates to power conversion apparatus and methods and, more particularly, to uninterruptible power supply (UPS) apparatus and methods.

UPS systems are commonly used in installations such as data centers, medical centers and industrial facilities to provide backup power to maintain operation in event of failure of the primary utility supply. These UPS systems often have an "on-line" configuration including a rectifier and inverter coupled by a DC link that is also coupled to an auxiliary power source, such as a battery, fuel cell or other energy storage device. Other configurations, such as standby and line-interactive configurations, may also be used. UPS systems may have a modular structure including two or more UPS modules, each of which may include, for example, a rectifier, an inverter and a DC/DC converter for interfacing to a battery or other DC power source. The modules commonly are designed to operate in parallel to provide scalable power capacity, e.g., the modules may be coupled in common to an AC source, a DC source (e.g., a battery) and/or a load.

Power supply systems using UPSs, such as those used for data center applications, may be configured in a variety of different redundant configurations to increase reliability and availability. Various redundant UPS arrangements are described, for example, in U.S. Pat. No. 7,265,458 to Edelen et al.

As shown in FIG. 1, UPSs may be used in what is referred to an "A-B" configuration. A UPS 110 may have a first AC input 101 coupled to a power conversion chain including a rectifier 112 and an inverter 114 and a second AC input 102 coupled to a semiconductor static switch 116 that acts as a bypass. The UPS 110 may also include a DC/DC converter 118 coupled to a DC link between the rectifier 112 and the inverter 114 and configured to be coupled to a battery 10.

Both of the AC inputs 101, 102 of the UPS 110 may be coupled to a first source A. An AC output 103 of the UPS 110 may be coupled to a first static switch 122 of a separate dual switch assembly 120. A second static switch 124 of the dual switch assembly 120 may be coupled to a second AC source B, which may be another UPS. An output of the dual switch assembly 120 is coupled to a critical load 130. If the source A fails, the UPS 110 may provide power from its battery. If the UPS 110 fails, the load 130 may be served from the second source B via the second static switch 124 of the dual switch assembly 120.

SUMMARY

Some embodiments of the inventive subject matter provide an uninterruptible power supply (UPS) including a frame, at least one AC input supported by the frame and configured to be coupled to at least one external power source and at least one AC output supported by the frame and configured to be coupled to at least one external load. The UPS also includes a power conversion circuit supported by the frame and having an output coupled to the at least one AC output, the power conversion circuit configured to selectively provide power from first and second power sources. The UPS further includes first and second static switches supported by the frame and configured to couple and decouple the at least one AC input to and from the at least one AC output and a control circuit supported by the frame and configured to cooperatively control the power conversion circuit and the first and second static switches.

The power conversion circuit may include a rectifier having an input coupled to the at least one AC input, a DC link coupled to an output of the rectifier and an inverter having an input coupled to the DC link and an output coupled to the at least one AC output. In some embodiments, the control circuit may be configured to concurrently close the first static switch and open the second static switch to support an increased efficiency mode of operation. The frame may include an enclosure containing the power conversion circuit and the first and second static switches.

Some embodiments provide a system including a plurality of UPSs, each including a frame, at least one AC input supported by the frame and configured to be coupled to at least one external power source, at least one AC output supported by the frame and configured to be coupled to at least one external load, a power conversion circuit supported by the frame and having an output coupled to the at least one AC output, first and second static switches supported by the frame and configured to couple and decouple the at least one AC input to and from the at least one AC output and a control circuit supported by the frame and configured to cooperatively control the power conversion circuit and the first and second static switches. The system further includes first and second AC power sources coupled to respective ones of the first and second static switches of the plurality of UPSs. The plurality of UPSs may include a plurality of first UPSs and the second AC power source may include at least one second UPS. Respective ones of the plurality of UPSs may be coupled to respective loads.

Further embodiments provide a system including a UPS that includes a frame, at least one AC input supported by the frame and configured to be coupled to at least one external power source, at least one AC output supported by the frame and configured to be coupled to at least one external load, a power conversion circuit supported by the frame and having an output coupled to the at least one AC output, first and second static switches supported by the frame and configured to couple and decouple the at least one AC input to and from the at least one AC output and a control circuit supported by the frame and configured to cooperatively control the power conversion circuit and the first and second static switches. The system further includes first and second loads coupled to respective ones of the first and second static switches.

In some embodiments, the first static switch may be coupled between an AC power source and the first load and the second static switch may be coupled between the first static switch and the second load. In further embodiments, the first static switch may be coupled between an AC power source and the first load and the second static switch may be coupled between the AC power source and the second load.

DETAILED DESCRIPTION

Figure 1:
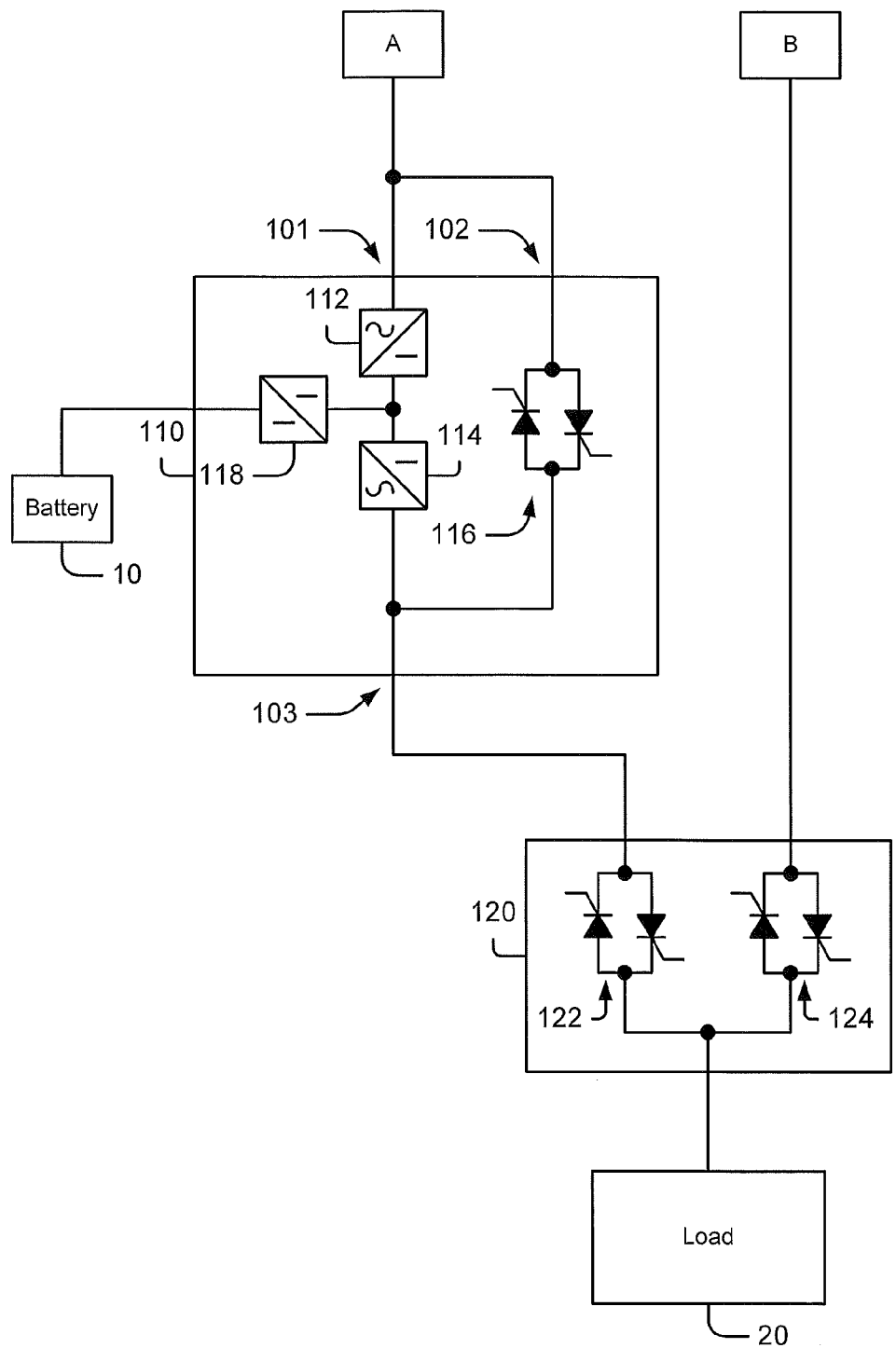
FIG. 1 is a schematic diagram illustrating a conventional power distribution system configuration.

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like elements. It will be understood that when an element is referred to as being "connected" or "coupled" to another element, it can be directly connected or coupled to the other element or intervening elements may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

Figure 2:
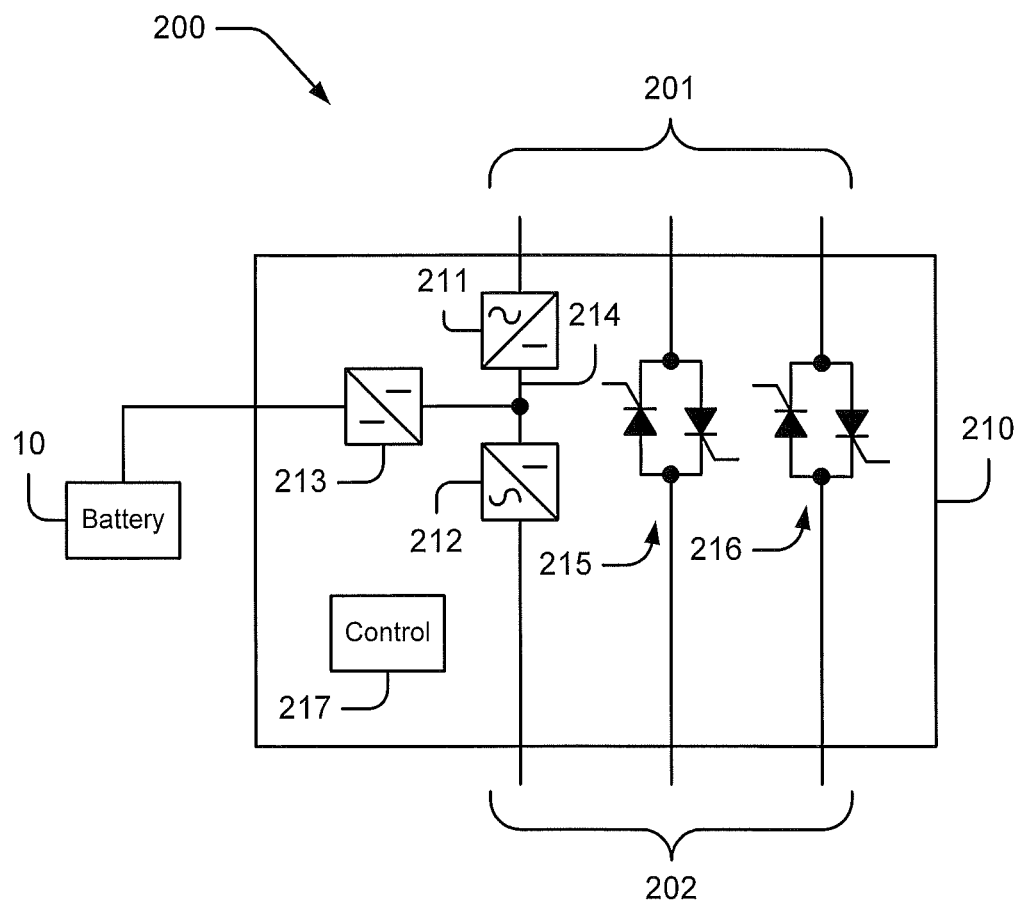
FIG. 2 is a schematic diagram illustrating an uninterruptible power supply (UPS) according to some embodiments of the inventive subject matter.

FIG. 2 illustrates a UPS 200 according to some embodiments of the inventive subject matter. The UPS 200 includes a frame 210. The frame 210 supports at least one AC input 201 for connection to at least one external AC power source and at least one AC output 202 for connection to at least one external load. Such connections may be provided using, for example, plug-in type connectors, terminal strips, wire lugs or the like. The UPS 200 also includes a power conversion circuit including a rectifier 211 and an inverter 212, also supported by the frame 210. The UPS 200 further includes a DC/DC converter 213, first static switch 215, second static switch 216 and associated control circuit 217 supported by the frame 210.

The rectifier 211 is coupled to the at least one AC input 201, and is configured to produce a DC voltage on a DC link 214 from AC power provided at the at least one AC input 201. The inverter 212 is coupled to the DC link 214 and to the at least one AC output 202 and is configured to generate an AC voltage at the at least one AC output 202 from a DC voltage on the DC link 214. The DC/DC converter 213 is also coupled to the DC link 214 and is configured to interface to a battery 10, here shown as located external to the UPS 200. In some embodiments, the DC/DC converter 213 may be omitted, and a direct connection between the battery 10 and the DC link 214 may be provided. In some embodiments, the battery 10 may be included in the UPS 200, i.e., may be supported by the common frame.

The first static switch 215 is coupled to the at least one AC input 201 and to the at least one AC output 202 and provides a switchable path therebetween under control of the control circuit 217. Similarly, the second static switch 216 is coupled to the at least one AC input 201 and to the at least one AC output 202 and provides a switchable path therebetween under control of the control circuit 217. As shown, the first and second static switches 215, 216 may be implemented using anti-parallel connected thyristors (e.g., silicon-controlled rectifiers (SCRs)), but it will be understood that the first and second static switches 215, 216 may be implemented using other arrangements of semiconductor and/or mechanical switching devices. Although the UPS 200 of FIG. 2 may provide respective external connections for the rectifier 211, inverter 212 and the first and second static switches 215, 216 it will be appreciated that common external connections may be provided for subsets of these components. For example, the rectifier 211 and the first static switch 215 may be internally connected such that a single external connection may be used for both the rectifier 211 and the first static switch 215. Similarly, the inverter 212 and the first static switch 215 may be internally connected such that a single external connection may be used for both the inverter 212 and the first static switch 215.

A control circuit 217 is configured to control the rectifier 211, inverter 212, DC/DC converter 213 and the first and second static switches 215, 216 in a coordinated manner. For example, in the event of a failure of the rectifier 211, the inverter 212 or an AC power source coupled to the rectifier 211, the control circuit 217 may operate one of the first and second static switches 215, 216 to provide an alternate path for power flow to the load 20. The control circuit 217 may also operate one of the first and second static switches 215, 216 to support an increased efficiency mode of operation in which the rectifier 211 and the inverter 212 are bypassed to provide power directly to the load 20, with the inverter 212 operating in a standby or active filter mode to provide battery backup power and/or power conditioning. It will be understood that, in general, the control circuit 217 may be implemented using analog circuitry, digital circuitry or combinations thereof. The control circuit 217 may include, for example, one or more data processing devices, such as a microprocessor or microcontroller, along with circuitry for driving power conversion components of the rectifier 211 and inverter 212 and the first and second static switches 215, 216.

Figure 8:
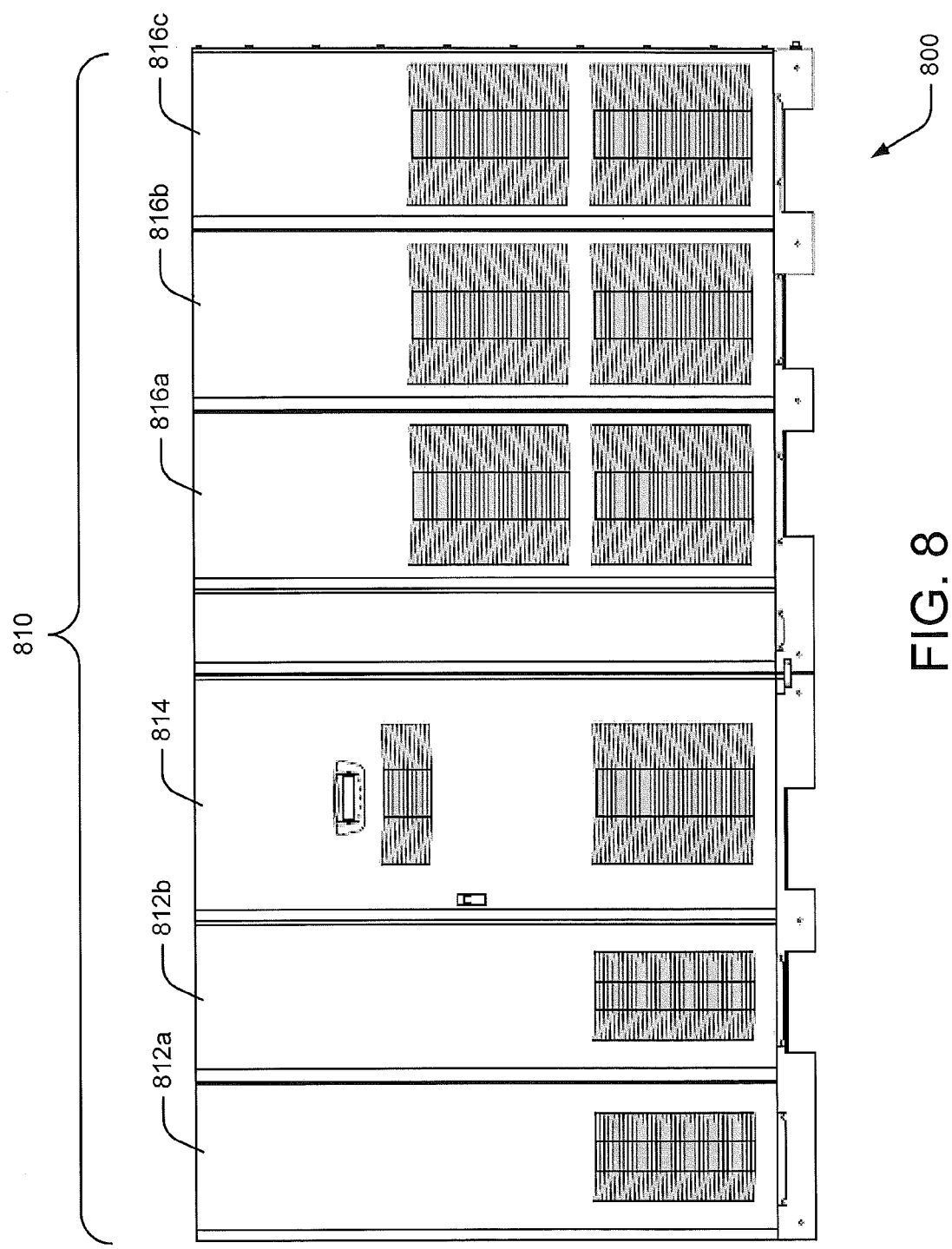
FIG. 8 is an elevation showing a physical configuration of a UPS according to some embodiments.

As described herein, a UPS, such as the UPS 200 of FIG. 2, is a unitary, discrete assembly configured as a single unit, as opposed to a collection of physically separated units interconnected by wiring external to the units (e.g., cables run loosely or in conduits or cable trays). In FIG. 2, the UPS 200 is shown as including a frame 210 conceptually illustrated using a bounding rectangle. In some embodiments, the frame 210 may be a supporting structure, such as an enclosure or housing or a set of housings conjoined or otherwise attached in a manner that provides a unitary structure. The enclosure or housing may be open, closed or may have open and closed portions and/or portions that may be accessible via doors or similar features. The enclosure or housing may contain components, such as support struts, support rails, interior shelves, etc., that are used to support electrical components of the UPS, such as the rectifier 211, inverter 212, DC/DC converter 212 and other electrical components of the UPS 200 of FIG. 2. An example of such a frame is illustrated in FIG. 8, which shows a UPS 800 with a unitary frame 810 including multiple cabinet-like sections 812a, 812b, 814, 816a, 816b, 816c conjoined to form a structural unit. The UPS 800 is provided for purposes of illustration, and it will be appreciated that other frame arrangements may be used in some embodiments.

Figure 3:
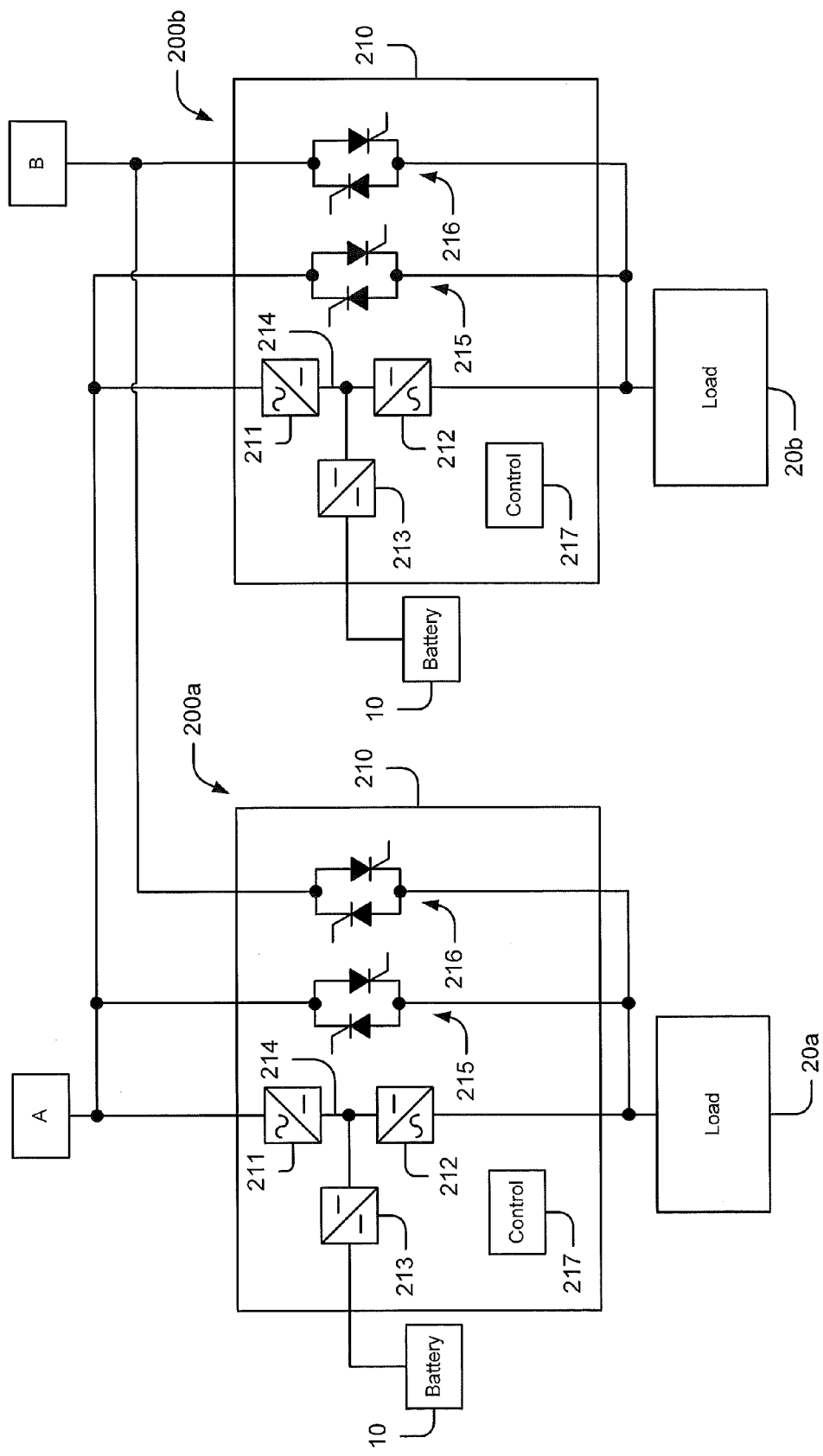
FIGS. 3-7 are schematic diagrams illustrating power distribution systems according to various embodiments of the inventive subject matter.

FIG. 3 illustrates an exemplary use of the UPS 200 of FIG. 2 to provide source redundancy according to some embodiments. First and second UPSs 200a, 200b have their rectifiers 211 coupled to a first AC power source A and their inverters 212 coupled to respective loads 20a, 20b. The first static switches 215 of the first UPS 200a and the second UPS 200b are also coupled to the first AC power source A, while the second static switches 216 of the first UPS 200a and the second UPS 200b are coupled to a second power source B. It will be appreciated that coupling between the first static switches 215 and the rectifiers 211 and inverters 212 may be external and/or may be internal to the UPSs 200a, 200b, as discussed above with reference to FIG. 2.

Some UPSs having a static bypass may be operated to provide a high efficiency mode wherein the bypass path is closed, allowing power to be transferred directly from the UPS input to the UPS output without passing through a rectifier/inverter chain, thus reducing losses associated with the operation of those components. Such a mode may be used, for example, when the AC input meets power quality criteria, with the rectifier/inverter chain being placed in a standby and/or active filter state. In such a state, the rectifier/inverter chain may be re-engaged should the AC input cease to meet those power quality criteria. Examples of such high-efficiency operating modes are described, for example, in U.S. Pat. No. 6,295,215 to Faria et al.

An arrangement along the lines shown in FIG. 3 may be particularly advantageous for providing redundant sourcing while also supporting a high efficiency mode. Referring to FIG. 3, when operating the first UPS 200a or the second UPS 200b in an on-line mode, the first and second static switches 215, 216 are open. If it is desired to transfer to a high-efficiency bypass mode, the control circuit 217 may close the first static switch 215, thus bypassing the rectifier 211 and inverter 212. In this mode, the inverter 212 may operate in a standby and/or active filtering mode, along the lines discussed above. The second static switch 216 provides the capability for the control circuit 217 to transition from the high-efficiency mode to the alternative second AC source B in the event the first AC source A fails. Because control of the first and second static switches 215, 216 is integrated with control of the rectifier 211 and the inverter 212 in a single UPS, this operation may be performed more smoothly and/or reliably, as coordination with external switches or other downstream devices may not be required.

Figure 4:
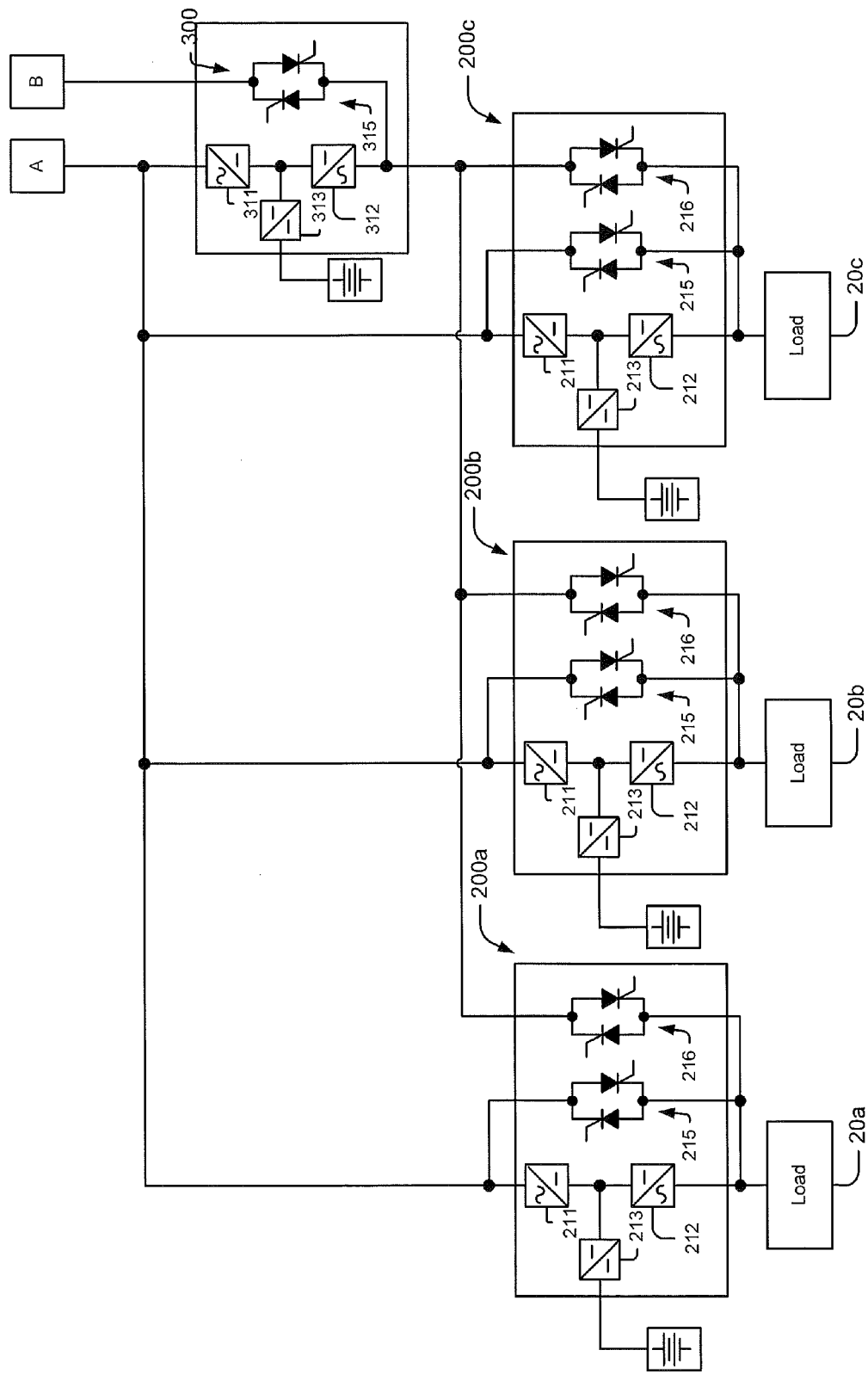

UPSs according to some embodiments may also be used advantageously in isolated redundant and other power system arrangements. For example, as shown in FIG. 4, a power system may include first, second and third UPSs 200a, 200b, 200c, each including a rectifier 211, inverter 212, DC/DC converter 213 and first and second static switches 215, 216. The rectifiers 211 and first static switches 215 of the UPSs 200a, 200b, 200c are coupled to a first power source A. The second static switches 216 of the UPSs 200a, 200b, 200c are coupled to the output of a fourth UPS 300. A rectifier 311 of the fourth UPS 300 is configured to be coupled to the first power source A such that, in the event of the failure of the rectifier 211 and/or inverter 212 or one or more of the first, second and third UPSs 200a, 200b, 200c, power may be passed via the rectifier 311 and inverter 312 of the fourth UPS 300 and the second static switch 216 of the affected one or more of the first, second and third UPSs 200a, 200b, 200c.

If the first power source A fails when in this configuration, power may be supplied from the battery associated with the fourth UPS 300 via the inverter 312 of the fourth UPS 300 and the second static switch 216 of the affected one or more of the first, second and third UPSs 200a, 200b, 200c. Should the rectifier 311 and/or inverter 312 of the fourth UPS 300 fail, a static switch 315 of the fourth UPS 300 may be closed, allowing power to pass from an alternative power source B to the second static switches 216 of the first, second and third UPSs 200a, 200b, 200c.

Figure 5:
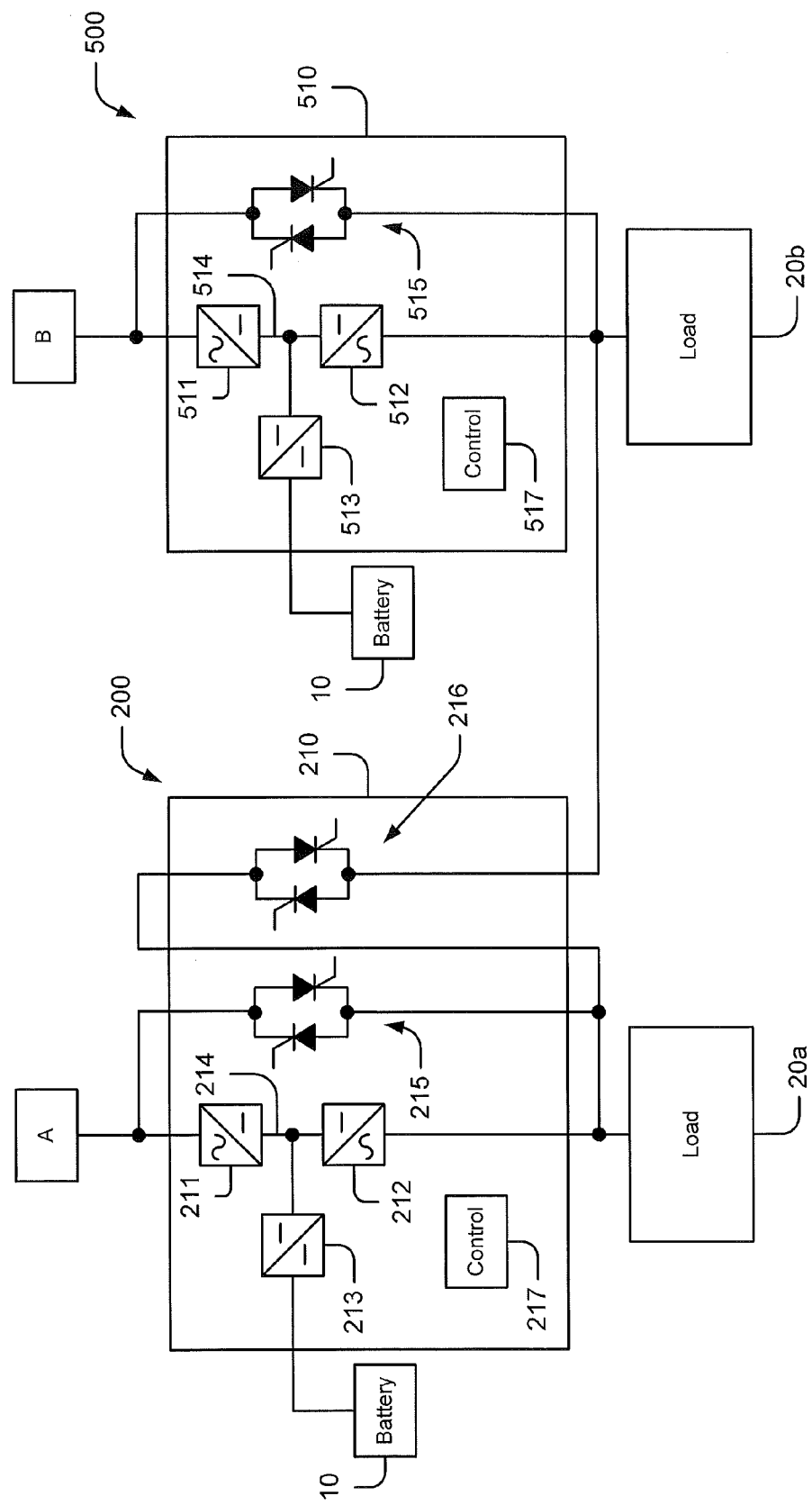

It will be appreciated that UPSs according to some embodiments of the inventive subject matter may be advantageously used in other power system arrangements, for example, to enable provision of power to separate loads from a single UPS. FIG. 5 illustrates an application in which a first UPS 200 as discussed above with reference to FIG. 2 is coupled to a first power source A and to a first load 20a. A second UPS 500, which includes a rectifier 511 and an inverter 512 and a DC/DC battery converter 513 coupled to a DC link 514, is coupled to a second power source B and a second load 20b. A static switch 515 is configured to bypass the rectifier 511 and the inverter 512. The second power source B is coupled to the rectifier 511 and the static switch 515, and the second load 20b is coupled to the inverter 512 and the static switch 515.

The rectifier 211 of the first UPS 200 is coupled to the first power source A, while the inverter 212 is coupled to the first load 20a. A first static switch 215 of the first UPS 200 is coupled connected to the first power source A and to the first load 20a and a second static switch 216 of the first UPS 200. The second static switch 216 of the first UPS 200 is also coupled to the second load 20b. This arrangement allows the first UPS 200 to provide power to the second load 20b from the inverter 212 or from the first power source A via the second static switch 216. The second static switch 216 may also be used to provide power to the first load 20a from the second UPS 500, i.e., from either the inverter 512 or via the static switch 515.

Figure 6:
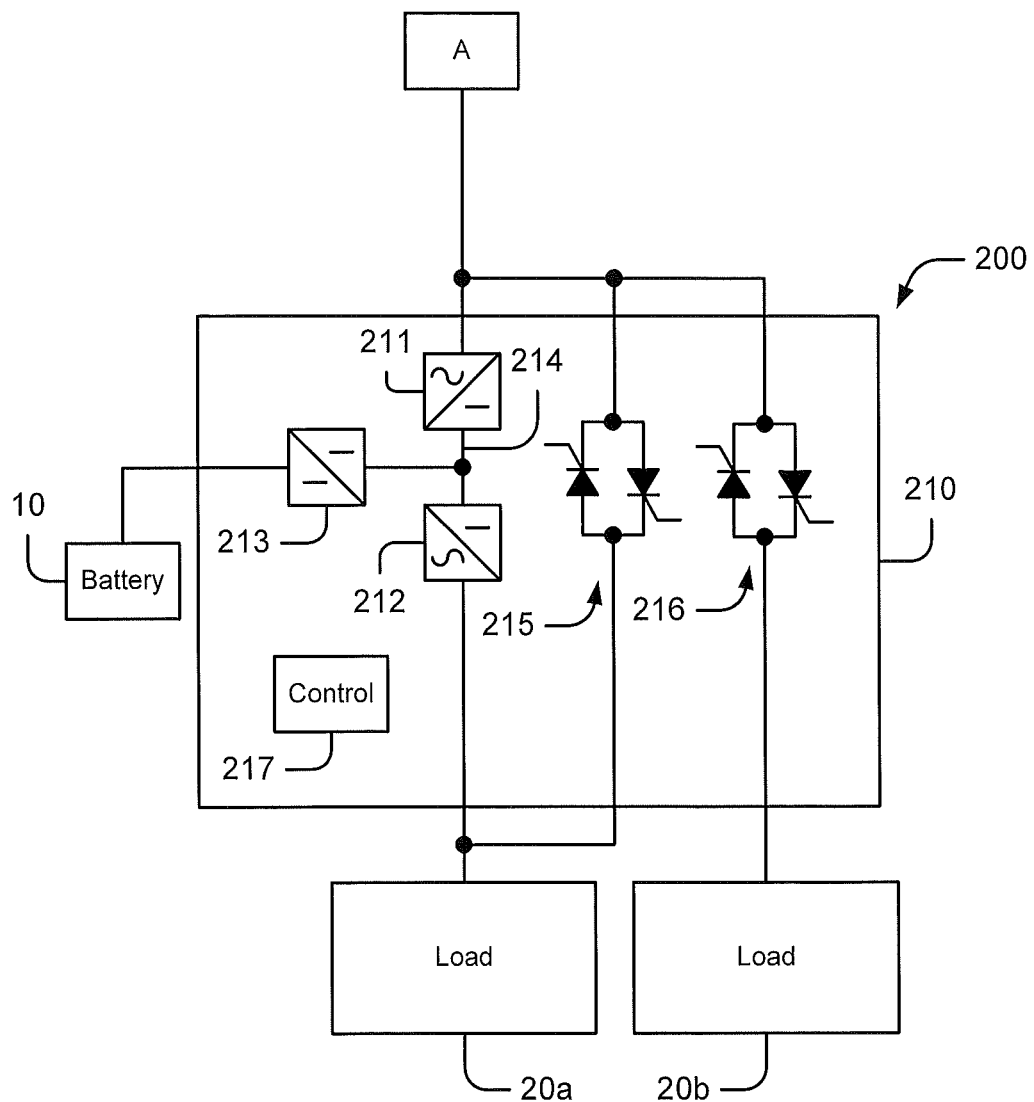

FIG. 6 illustrates a further application of a UPS 200 along the lines discussed above with reference to FIG. 2. A rectifier 211 is coupled to a power source A, while an inverter 212 is coupled to a first load 20a. A first static switch 215 is connected between the power source A and the first load 20a, while the second static switch 216 is coupled between the power source A and a second load 20b. The first load 20a may be, for example, a critical load for which UPS redundancy is desirable, while the second load 20b may be, for example, non-critical load that does not require UPS protection.

Figure 7:
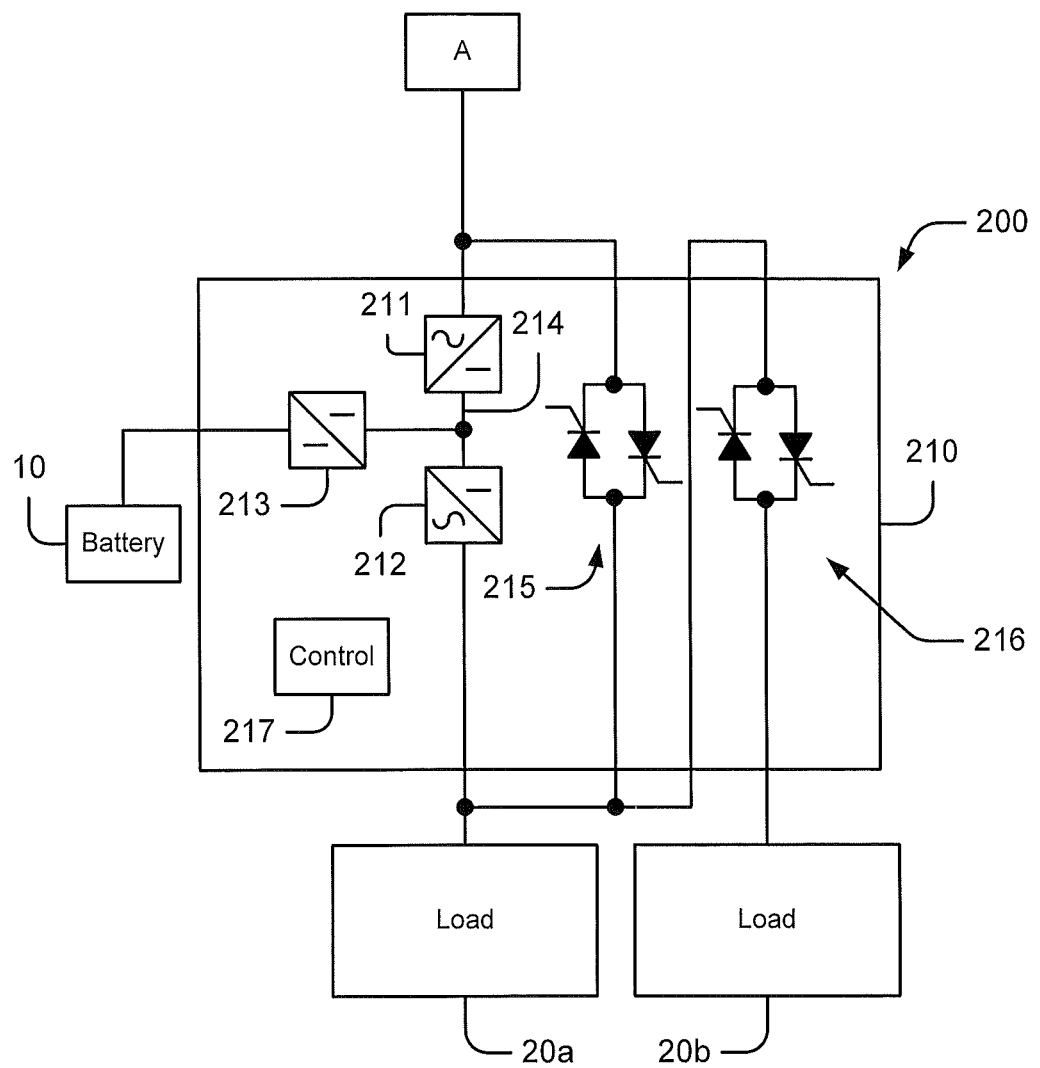

FIG. 7 illustrates yet another application of a UPS 200 along the lines discussed above with reference to FIG. 2. A rectifier 211 is coupled to a power source A, which an inverter 212 is coupled to a first load 20a. A first static switch 215 is coupled between the power source A and the first load 20a. A second static switch 216 is coupled between inverter 212 and first static switch 215 and a second load 20b. This arrangement may allow for shedding of the second load 20b under certain circumstances, for example, when the UPS 200 is operating in an on-line and/or on-battery mode and has insufficient capacity to power both the first load 20a and the second load 20b.

It will be appreciated that the power system arrangements of FIGS. 3-7 are provided for purposes of illustrations, and that UPSs according to further embodiments may be used in other ways.

In the drawings and specification, there have been disclosed exemplary embodiments of the inventive subject That which is claimed:

1. An uninterruptible power supply (UPS) comprising:
a frame;
first, second and third AC inputs supported by the frame and separately and independently coupleable to different power sources;
first, second and third AC outputs supported by the frame and separately coupleable to different loads;
a power conversion circuit supported by the frame and having an output coupled to the first AC output, the power conversion circuit coupled to the first AC input and configured to provide power to the first AC output;
a first static switch supported by the frame and configured to selectively couple the second AC input to the second AC output;
a second static switch supported by the frame and configured to selectively couple the third AC input to the third AC output; and
a control circuit supported by the frame and configured to cooperatively control the power conversion circuit and the first and second static switches.

2. The UPS of claim 1, wherein the power conversion circuit comprises:
a rectifier having an input coupled to the first AC input;
a DC link coupled to an output of the rectifier; and
an inverter having an input coupled to the DC link and an output coupled to the first AC output.

3. The UPS of claim 2, wherein the control circuit is configured to concurrently close the first static switch and open the second static switch to support an increased efficiency mode of operation in which the power conversion circuit is bypassed.

4. The UPS of claim 1, wherein the frame comprises an enclosure containing the power conversion circuit and the first and second static switches.

5. A system comprising:
a plurality of UPSs, each of the UPSs comprising;
a frame;
first, second and third AC inputs supported by the frame and separately and independently coupleable to different power sources;
first, second and third AC outputs supported by the frame and separately coupleable to different loads;
a power conversion circuit supported by the frame and having an output coupled to the first AC output;
a first static switch supported by the frame and configured to selectively couple the second AC input to the second AC output;
a second static switch supported by the frame and configured to selectively couple the third AC input to the third AC output; and
a control circuit supported by the frame and configured to cooperatively control the power conversion circuit and the first and second static switches; and
first and second AC power sources coupled to respective ones of the first and second static switches of the plurality of UPSs.

6. The system of claim 5, wherein the plurality of UPSs comprises a plurality of first UPSs and wherein the second AC power source comprises at least one second UPS.

7. The system of claim 5, wherein respective ones of the plurality of UPSs are coupled to respective loads.

8. The system of claim 5, wherein the power conversion circuit comprises:
a rectifier having an input coupled to the first AC input;
a DC link coupled to an output of the rectifier; and
an inverter having an input coupled to the DC link and an output coupled to the first AC output.

9. The system of claim 8, wherein the control circuit is configured to concurrently close the first static switch and open the second static switch to support an increased efficiency mode of operation in which the inverter and the rectifier are bypassed.

10. The system of claim 5, wherein the frame comprises an enclosure containing the power conversion circuit and the first and second static switches.

11. A system comprising:
a UPS comprising;
a frame;
first, second and third AC inputs supported by the frame and separately and independently coupleable to different power sources;
first, second and third AC outputs supported by the frame and separately coupleable to different loads;
a power conversion circuit supported by the frame and having an output coupled to the first AC output;
a first static switch supported by the frame and configured to selectively couple the second AC input to the second AC output;
a second static switch supported by the frame and configured to selectively couple the third AC input to the third AC output; and
a control circuit supported by the frame and configured to cooperatively control the power conversion circuit and the first and second static switches; and
first and second loads coupled to respective ones of the first and second static switches.

12. The system of claim 11:
wherein the first static switch is coupled between an AC power source and the first load; and
wherein the second static switch is coupled between the first static switch and the second load.

13. The system of claim 11:
wherein the first static switch is coupled between an AC power source and the first load; and
wherein the second static switch is coupled between the AC power source and the second load.

14. The system of claim 11, wherein the power conversion circuit comprises:
a rectifier having an input coupled to the first AC input;
a DC link coupled to an output of the rectifier; and
an inverter having an input coupled to the DC link and an output coupled to the first AC output.

15. The system of claim 11, wherein the frame comprises an enclosure containing the power conversion circuit and the first and second static switches.

* * * * *